June 28, 1966 P. A. STURROCK 3,258,706
NOISE REDUCTION IN SLOW BEAM WAVES BY PARAMETRIC COOLING
Filed May 2, 1961 2 Sheets-Sheet 1
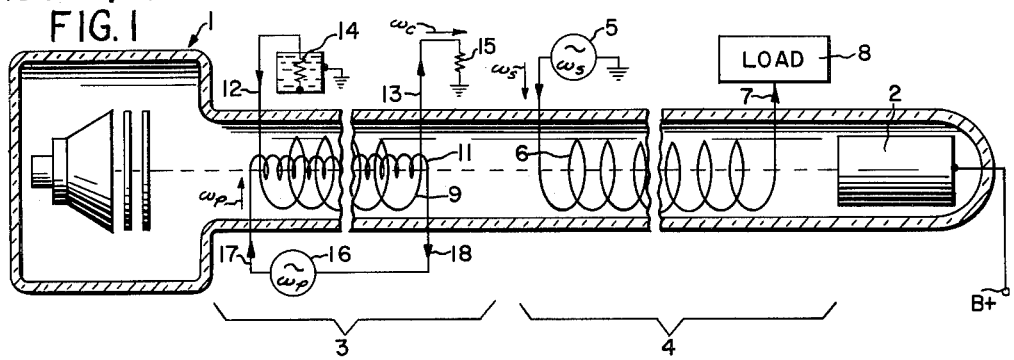
FIG. 1
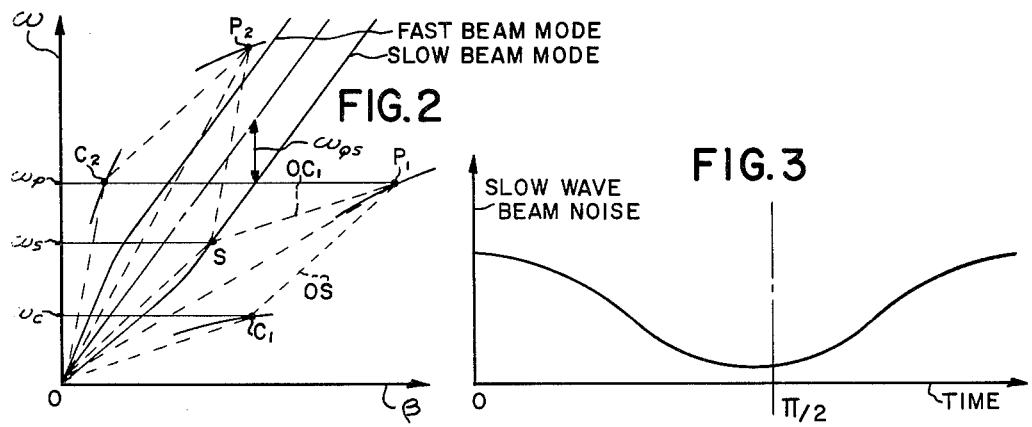
FIG. 2
FIG. 3
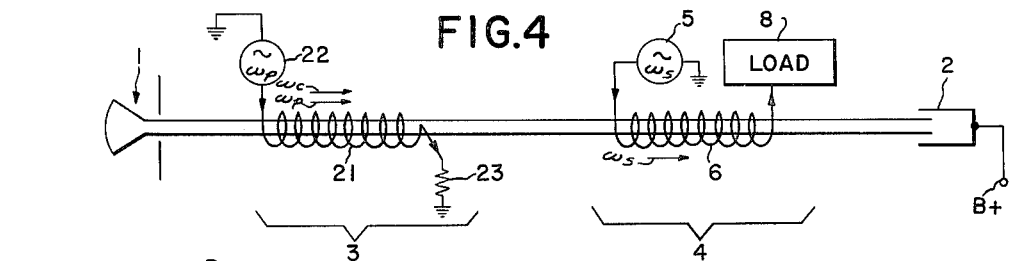
FIG. 4
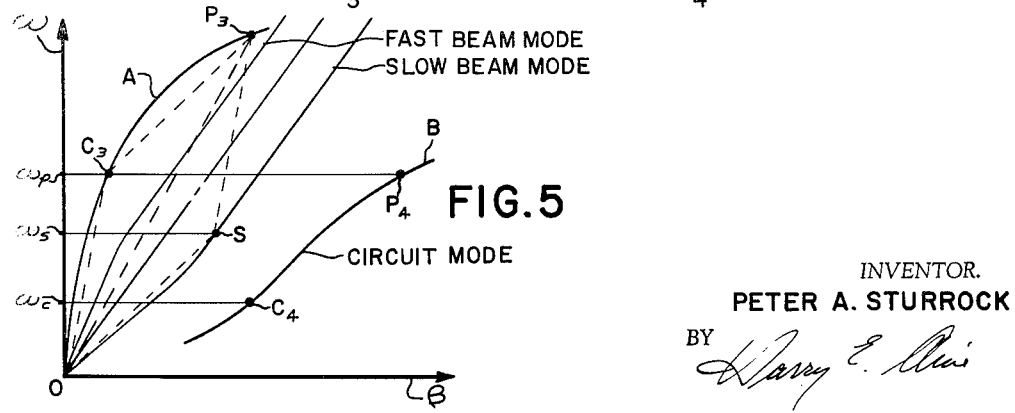
FIG. 5
INVENTOR.
PETER A. STURROCK
BY
ATTORNEY

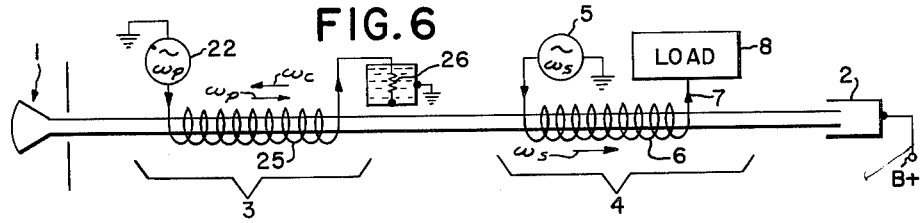
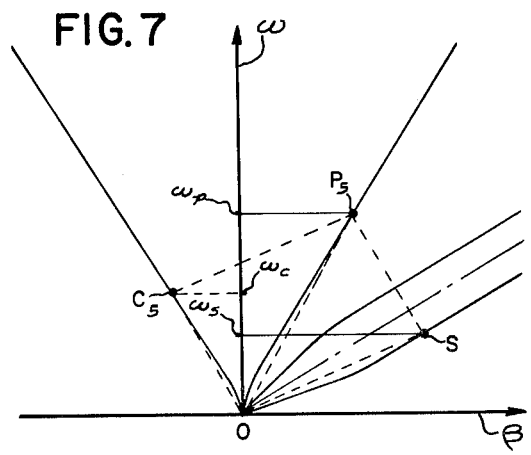
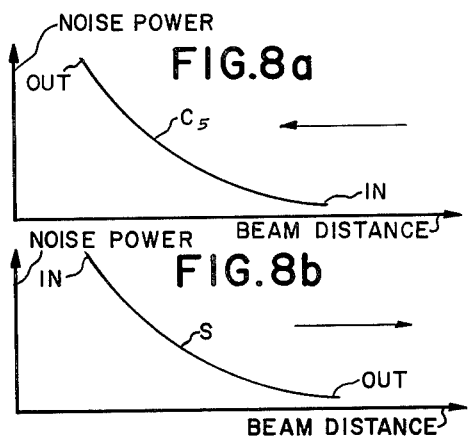
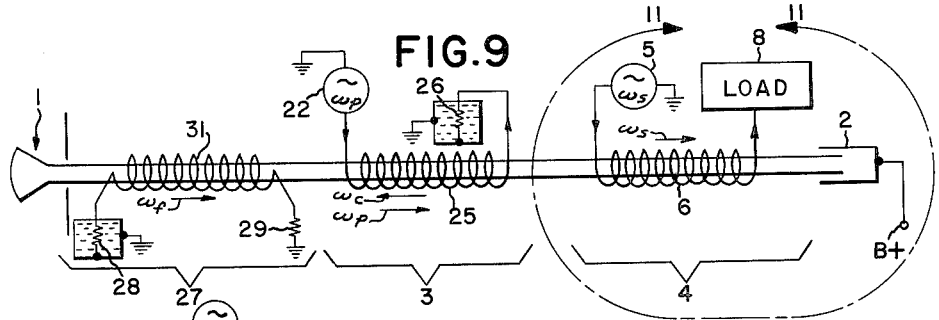
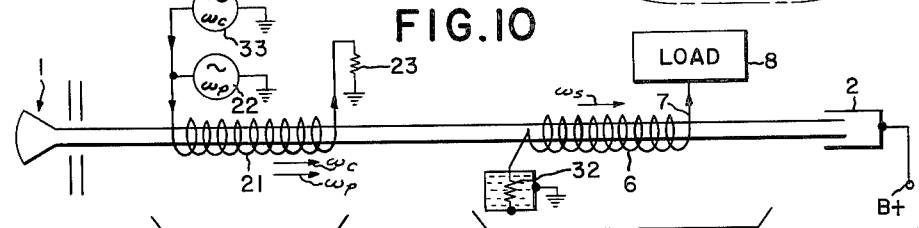
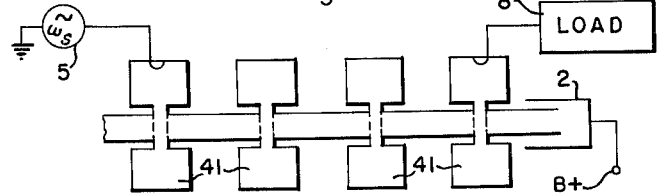

United States Patent Office 3,258,706
Patented June 28, 1966

3,258,706
NOISE REDUCTION IN SLOW BEAM WAVES
BY PARAMETRIC COOLING
Peter A. Sturrock, Los Altos, Calif., assignor to Varian Associates, Palo Alto, Calif., a corporation of California
Filed May 2, 1961, Ser. No. 107,089
19 Claims. (Cl. 330—43)

The present invention relates in general to electron discharge devices and more particularly to parametric cooling of slow beam waves, or in other words, removal of noise power from slow beam waves. Cooled slow beam waves are especially useful for providing extremely low noise amplification of microwave signals utilizing conventional slow-wave circuits.

Modulation present on a beam, whether it be transverse modulation, producing cyclotron or electrostatic transverse waves, or longitudinal velocity modulation, producing space charge waves, may freely propagate along the beam in a substantially unattenuated manner as a beam wave. Thus, the beam acts like a transmission line for wave energy impressed thereon.

Modulation on a beam of sufficient charge density is thereby split into two possible space charge modes of wave propagation. Also, a sufficiently strong axial magnetic field will split a beam into two possible cyclotron modes of wave propagation. Thus, a beam wave, whether it be transverse electrostatic, cyclotron or longitudinal space charge, freely travels substantially unattenuated along the beam in either or both of two possible beam modes. The two modes correspond to one or the other of two phase velocities for a beam wave of a certain frequency.

One of the possible beam modes corresponds to a phase velocity greater than the D.C. velocity of the unmodulated beam and is referred to as the fast beam mode. The other beam mode corresponds to a phase velocity which is slower than the D.C. velocity of the unmodulated beam and is referred to as a slow beam mode.

The phase velocities of the fast and slow beam modes, in a given beam, are typically a function of frequency. A beam characterized by phase velocities, for the fast and slow modes, which vary considerably with frequency is referred to as a highly dispersive beam.

In the conventional traveling wave tube, interaction takes place between an electromagnetic wave traveling along a slow-wave structure or circuit and the slow beam wave mode of the beam with resulting amplification of the electromagnetic wave on the slow-wave structure or circuit. Noise power present on the slow beam mode, within the active bandwidth of the slow-wave circuit, is amplified by the wave-beam interaction mechanism of the conventional traveling wave tube and appears in the amplified R.F. output. Therefore, a means for removing noise power from the slow beam mode is highly desirable.

Noise power per unit bandwidth is defined by the following relationship:

$$|S| = kT\Delta f \quad (1)$$

where $|S|$ is the magnitude of the noise power per unit bandwidth, $k$ is Boltsman's constant, $T$ is the effective temperature of the beam, and $\Delta f$ is the bandwidth in cycles per second of the frequency band under consideration. From the above expression it can be seen that the noise power per unit bandwidth is a measure of the effective beam temperature. Thus, removing noise from the beam can be considered as lowering its temperature and will hereinafter be referred to as cooling the beam.

Wave power is proportional to velocity. Hence, power transmitted in the slow beam mode is negative with respect to the unmodulated D.C. power of the beam whereas power transmitted in the fast beam mode is positive with respect to the unmodulated D.C. power of the beam.

Positive noise power may be readily removed from the beam by the provision of a suitable coupler such as, for example, a Kompfner Dip helix having a phase velocity equal to the phase velocity of the fast beam mode and properly matched to the impedance of the fast wave energy of the beam. Thus, there exists a rather straightforward mechanism for removing noise power, at a certain frequency band, from the fast beam mode. However, removing noise from the slow beam mode is not subject to such a straightforward solution since the power traveling in a slow beam mode is negative with respect to the D.C. power of the beam.

Circuit wave energy, of a certain frequency, on an R.F. structure will travel along the structure at one or more possible phase velocities corresponding to one or more certain circuit modes of propagation as determined by the physical and electrical characteristics of the structure. These possible phase velocities correspond to operating points on an $\omega$–$\beta$ curve for the R.F. structure. The operating points are defined by intersections of a constant frequency line, at the frequency of interest, with the R.F. circuit curve.

When the fields of an excited circuit wave, traveling in a certain circuit mode, are brought into coupled electromagnetic relationship with a beam of electrons, the circuit wave will excite a beam wave in one or more of at least three modes of propagation. It will excite two free running substantially unattenuated fast and slow beam waves, as indicated above. When the phase velocity of the excited circuit wave is substantially different from that of the fast or slow beam waves, then it will excite a forced beam wave on the beam with a phase velocity equal to the phase velocity of the circuit wave.

The forced beam wave will be rapidly attenuated when the circuit wave is removed, whereas the free running beam waves of either the fast or slow beam mode will continue to run with the beam in a substantially unattenuated manner.

Heretofore it has been proposed that the free running slow beam wave could be cooled by transferring noise power from the slow beam wave to a previously cooled fast beam wave. The fast beam wave may be cooled in the conventional manner as by, for example, a Kompfner Dip helix with cooled matched terminating loads. The transfer of noise power from the slow beam wave to the fast beam wave is obtained by a parametric coupling mechanism using sum-frequency coupling of the free running fast and slow beam waves by means of a forced pump beam wave.

Sum-frequency parametric coupling between the slow beam wave and the fast beam wave will be obtained by means of a forced pump wave when the following conditions are satisfied:

$$\omega_f + \omega_s = \omega_p$$

and                                              (2)

$$\beta_f + \beta_s = \beta_p$$

where $\omega_f$, $\omega_s$ and $\omega_p$ are the frequencies of the fast beam wave, slow beam wave and pump wave, respectively; and $\beta_f$, $\beta_s$ and $\beta_p$ are the phase constants of the fast beam wave, slow beam wave and pump wave, respectively. Stated another way, parametric sum-frequency coupling conditions are satisfied when the sum of vectors defined by the lines from the origin O of the $\omega$–$\beta$ diagram to the operating points $\omega_f\beta_f = F$, $\omega_s\beta_s = S$, and $\omega_p\beta_p = P$ satisfy the following equation:

$$\vec{OF} + \vec{OS} = \vec{OP} \quad (3)$$

The difficulty of the prior art coupled fast and slow beam wave scheme is that one does not have control over the phase velocities of the free running fast and slow beam waves, so that one may either not have adequate coupling between the three waves of interest or, one might encounter strong coupling between two of these waves and a third wave which was not supposed to take part in the wave interaction process.

In the present invention it has been found that noise power present on the slow beam wave may be transferred to a suitable cooling circuit wave, as opposed to a cooled fast beam wave, previously proposed, by use of the parametric sum-frequency coupling mechanism. More specifically, the present invention provides parametric coupling of a slow beam wave to a cooling circuit wave by means of a pump circuit wave to effect a net transfer of noise power on the slow beam wave directly to the cooling circuit.

A signal on the cooling circuit may also be transferred by this mechanism to the slow beam wave for subsequent amplification by a conventional traveling wave tube circuit. However, the signal need not be inserted by means of the cooling circuit but may be inserted in the conventional manner on the conventional traveling wave tube circuit downstream of the beam cooling apparatus.

The advantage of using a cooling circuit as opposed to a free running cooling fast beam wave is that greater control of the phase velocity of the cooling circuit wave is obtained than is possible with the relatively fixed phase velocity of a fast beam mode. This additional flexibility in design permits avoidance of unwanted coupling between certain bands of frequencies, if desired.

The conditions for parametric sum-frequency coupling of the slow beam wave and the cooling circuit wave are essentially the same as those set forth above in Equations 2 and 3, with the exception of the substitution of $\omega_c$ and $\beta_c$ for $\omega_f$ and $\beta_f$, where $\omega_c$ and $\beta_c$ are the cooling circuit wave frequency, and cooling circuit wave phase constants, respectively and $\omega_c$, $\beta_c=C$. In addition, in Equation 3 $\overrightarrow{OC}$ is substituted for $\overrightarrow{OF}$.

If the cooling circuit wave has a higher frequency $\omega_c$ than the slow beam wave frequency $\omega_s$, the slow beam wave may be cooled to a lower temperature than the initial temperature of the cooling circuit.

The principal object of the present invention is to provide method and apparatus for cooling the slow beam wave of a beam of charged particles.

One feature of the present invention is the provision of method and apparatus for cooling a slow beam wave of an electron beam by parametrically sum-frequency coupling the slow beam wave to a cooling circuit wave by means of a pump circuit wave to effect a net transfer of noise power from said slow beam wave to said cooling circuit.

Another feature of the present invention is the same as the preceding feature wherein the pump circuit structure and the parametrically coupled cooling circuit structure include the same R.F. structure in electromagnetic coupled relationship with the beam.

Another feature of the present invention is the same as the first feature wherein axially coextensive separate R.F. circuit structures are provided for propagating the coupled cooling circuit wave and the pump circuit wave.

Another feature of the present invention is the same as any one of the preceding features wherein the cooling circuit wave propagates over an R.F. cooling structure in coupled relationship with the beam, the circuit wave being a backward traveling wave with respect to the beam whereby an exponential transfer of noise energy is obtained from the slow beam wave to the cooling circuit wave.

Another feature of the present invention is the same as any of the preceding features including the additional provision of a slow-wave circuit structure coupled to the beam downstream of said pump circuit structure and of said cooling circuit structure for effecting cumulative interaction between a signal circuit wave and the cooled slow beam wave whereby low noise slow-wave interaction may be obtained.

Another feature of the present invention is the same as the preceding feature including the additional provision of an R.F. fast-wave circuit structure coupled to the beam upstream of the slow-wave signal circuit structure for coupling to and removing noise power from the fast beam mode, whereby noise on the fast beam mode is removed to prevent inadvertent coupling of fast-wave noise power onto the slow signal wave.

Another feature of the present invention is the provision of a klystron interaction R.F. circuit coupled to the beam downstream of both a fast and slow beam wave cooling section.

Another feature of the present invention is the same as any of the preceding features wherein the signal wave is impressed on the slow beam mode by the cooling circuit R.F. structure.

Another feature of the present invention is the same as any of the preceding features wherein the cooling circuit wave is of a higher frequency than the cooled slow beam wave whereby the slow beam wave may be cooled to a lower temperature than the initial temperature of the cooling circuit.

Another feature of the present invention is the same as any of the preceding features wherein the cooled slow beam wave propagates in either the slow cyclotron, slow longitudinal space charge, or slow transverse electrostatic mode.

These and other features and advantages of the present invention will become apparent upon a perusal of the specification taken in connection with the accompanying drawings wherein:

FIG. 1 is a slow-wave amplifier tube utilizing the parametric slow beam wave cooling features of the present invention, FIG. 2 is a fraquency, $\omega$, vs. phase constant, $\beta$, diagram showing the parametric sum-frequency coupling mechanism between the slow beam wave and the pump and cooling circuit waves for the structure of FIG. 1, FIG. 3 is a diagram depicting the energy exchange relationship between the slow beam wave and the cooling circuit wave for the structure of FIG. 1, FIG. 4 is a schematic diagram of a slow-wave amplifier using an alternative slow beam wave cooling embodiment of the present invention, FIG. 5 is a frequency, $\omega$, vs. phase constant, $\beta$, diagram depicting the sum-frequency parametric beam coupling mechanism for the structure of FIG. 4, FIG. 6 is a schematic diagram of a slow-wave amplifier utilizing an alternative slow beam wave cooling embodiment of the present invention, FIG. 7 is a frequency, $\omega$, vs. phase constant, $\beta$, diagram depicting the sum-frequency coupling of the structure of FIG. 6, FIGS. 8a and 8b are diagrams depicting the energy exchange relationship between the parametric beam cooling circuit C and the slow beam wave S for the structure of FIG. 6, FIG. 9 is a schematic diagram of a slow beam wave amplifier employing alternative features of the present invention, FIG. 10 is a schematic diagram of a slow beam wave amplifier employing an alternative feature of the present invention, and FIG. 11 is a schematic diagram of an alternative embodiment of the present invention wherein a portion of the structure of FIG. 9, delineated by line 11—11, is replaced by the structure of FIG. 11.

Referring now to FIG. 1 there is shown a slow-wave amplifying tube utilizing certain features of the present invention. More particularly, a source of charged particles as, for example, an electron gun 1 develops and projects a stream of electrons over a predetermined beam path to a collecting electrode 2. The electron gun 1 may be entirely conventional and preferably includes the usual cathode together with suitable focusing and accelerating electrodes for developing a well defined beam of electrons. For convenience of illustration, this electron gun has been schematically shown at 1. The electron collector 2 usually takes the form of an anode biased at a positive potential with respect to the cathode as indicated by potential source B+.

Two wave-beam interaction regions, each performing different functions, are included along the beam path intermediate between the electron gun 1 and the collector 2. The first wave-beam interaction region 3 receives the electron beam after emerging from the electron gun and serves to cool the slow beam wave of the electron beam. The cooled electron beam is then supplied, downstream of the cooling section 3, to the second wave-beam interaction region 4 which includes a conventional traveling wave tube interaction region for amplification of signal wave energy $\omega_s$ injected from a suitable source 5 onto the conventional slow-wave helix 6. The amplified R.F. output is extracted at terminal 7 and applied to a suitable load 8.

In the slow beam wave cooling section 3, two coaxially disposed mutually insulated helices 9 and 11 surround the beam and have a substantial portion of their lengths which are coextensive with each other. Cooling helix 9 serves to support the cooling circuit wave of frequency $\omega_c$ and the ends of the beam cooling helix 9 are withdrawn from the tube's vacuum envelope at terminals 12 and 13 and are terminated in suitable matched resistive loads 14 and 15, respectively. In a preferred embodiment the resistive loads 14 and 15 are cooled to a low temperature as by, for example, a liquid nitrogen bath. Conventional coupling devices such as coupling helices, not shown for the sake of simplicity, are preferably employed for coupling wave energy onto and off of the terminals of helices 6, 9 and 11.

The beam cooling and pumping helices 9 and 11 are dimensioned to provide phase velocities corresponding to sum-frequency parametric coupling as specified in Equations 2 and 3 and as shown in the $\omega$–$\beta$ diagram of FIG. 2. More specifically, the cooling and pump helices 9 and 11, respectively, are proportioned and dimensioned with respect to each other and to the slow beam wave such that the vector sum of the slow beam wave operating point OS and of the cooling circuit wave operating point $OC_1$ equals the vector $OP_1$ to the pump circuit wave operating point $P_1$. It will be noted that the pump and cooling circuit waves corresponding to operation points $C_1$ and $P_1$ have phase velocities less than the phase velocity of the slow beam wave. This is not a requirement and it is possible for the pump and circuit helices 9 and 11 to be dimensioned to provide phase velocities higher than the phase velocity of the slow beam wave. Such higher phase velocities are associated with pump and cooling circuit operating points $P_2$ and $C_2$, respectively. When the circuit wave frequency $\omega_c$ is higher than the slow beam wave frequency $\omega_s$, it is possible to cool the slow beam wave to a temperature lower than the initial temperature of the cooling circuit.

In operation, slow beam wave operating point S is automatically determined by the frequency $\omega_s$ of the slow beam wave energy that it is desired to cool for subsequent use in the conventional slow-wave interaction section 4. The other operating points as, for example, $C_1$ and $P_1$ are selected, and the respective circuits 9 and 11 proportioned and dimensioned to produce sum-frequency coupling. When sum-frequency parametric coupling is obtained the pump circuit wave, which may be either a forward or backward wave, will produce a forced beam pump wave and cause an energy exchange to occur between the slow beam wave at frequency $\omega_s$ and the cooling circuit wave at frequency $\omega_c$ such as to transfer noise energy on the slow beam wave to the cooling circuit wave where it is dissipated in matched load 15.

The energy exchange relationship between the slow beam wave $\omega_s$ and the cooling circuit wave $\omega_c$ can be more clearly seen by reference to FIG. 3. From FIG. 3, it is seen that the energy exchange relationship is oscillatory in nature such that the axial length of the coextensive beam-field interaction region of the helices 9 and 11 should be properly dimensioned and is preferably approximately a quarter wavelength of the oscillatory interaction exchange process.

The preferred length L of the coextensive portion of the helices 9 and 11 is defined by the following relationship:

$$L = \frac{\pi}{2K} \quad (4)$$

where K is the phase constant for the energy exchange process.

K is found by the following relationship:

$$K^2 = \frac{1}{64} \frac{Z_c \omega_c \beta_c^4 \Delta^2}{Z_B \omega_{Qs} \beta_p^2} \quad (5)$$

where $Z_c$ is the cooling circuit beam coupling impedance; $Z_B$ is the beam impedance, $V/I$ where V is the beam voltage and I is the beam current; $\omega_c$ is the frequency of the cooling circuit wave in radians per second; $\omega_{Qs}$ is the reduced plasma frequency at the slow-wave frequency; $\beta_c$ is the phase constant of the cooling circuit wave; $\beta_p$ is the phase constant of the pump circuit wave; and $\Delta$ is the depth of the beam modulation due to the pump circuit wave where $$\Delta = \frac{\Delta\rho}{\rho}$$

and $\Delta\rho$ is the minimum beam charge density and $\rho$ is the mean beam charge density.

The pump power $S_p$ required at $\omega_p$ is found from the following relationship:

$$S_p = \frac{2\alpha^4 \Delta^2 V^2}{Z_p} \quad (6)$$

where $Z_p$ is the pumping circuit beam coupling impedance;

$$\alpha = \left| \frac{u-v}{v} \right|$$

where $u$ is the pump circuit phase velocity at the pump frequency, and $v$ is beam velocity; and V is the beam voltage.

Referring now to FIG. 4 there is shown an alternative embodiment of the present invention wherein the elements are merely schematically indicated and like numerals of FIG. 4 refer to like elements of FIG. 1. The slow-wave tube of FIG. 4 includes the conventional electron gun 1 projecting a beam of electrons over a beam path to a collector electrode 2. A slow beam wave cooling apparatus is provided in region 3 for cooling the slow beam wave before application of the slow beam wave to the input of the conventional slow-wave interaction region 4.

In this embodiment, the pump and cooling circuit wave propagating structures have been combined into a single R.F. structure having suitable dispersive wave propagating characteristics as indicated in FIG. 5. More particularly, a single helix 21 serves the function of the two separate helices 9 and 11 of FIG. 1. Helix 21 has a propagation characteristic as indicated by curve A in FIG. 5 and provides two separate operating points $C_3$ and $P_3$ corresponding to the cooling circuit wave and pump wave, respectively. As in the embodiment of FIG. 1, the vector $OP_3$ is equal to the sum of vectors $OC_3$ and OS such that sum-frequency parametric coupling is obtained between the slow beam wave S and the circuit wave $C_3$ by means of the pump wave $P_3$.

Pump wave energy is supplied to the helix 21 from a suitable signal source 22 impedanced matched to the helix 21 at the pump frequency $\omega_p$. The circuit pump wave propagates in the same direction as the beam and is withdrawn from the downstream terminal of the helix 21 and matched into resistive load 23 which is matched to the helix 21 at both $\omega_c$ and $\omega_p$. The second operating point $C_3$ of the helix 21 corresponds to the circuit wave of frequency $\omega_c$ traveling in the same direction as the beam. Resistive load 23 is matched to the helix 21 at $\omega_c$ for dissipating the noise energy removed from the slow beam wave and as parametrically coupled onto the helix 21 in the form of a circuit wave at the circuit wave frequency $\omega_c$.

The cooled slow beam wave of the electron beam is then passed into the conventional slow-wave interaction region 4 where cumulative wave-beam interaction is obtained between a slow-wave helix 6 supplied with signal wave energy from a signal source 5 at frequency $\omega_s$. The amplified signal wave energy is withdrawn from the helix 6 and supplied to the load 8.

As in the structure of FIG. 1, the single helix 21 may supply a pump wave phase velocity higher than the beam velocity or lower than the beam velocity depending upon the characteristics of the helix. If the characteristic of the helix 21 is selected to correspond with curve A, having operating points $C_3$ and $P_3$, it will be possible to cool the slow beam wave to a lower temperature than the initial temperature of the circuit 21 because the circuit wave frequency will be higher than the slow beam wave frequency. This characteristic may be produced by an auxiliary helix, not shown, surrounding the helix 21 and serving to load helix 21 in the appropriate manner.

Curve B represents a single helix 21 with operating points $C_4$, $P_4$, for circuit and pump waves, respectively. Here again, the energy exchange relationship between the slow beam wave and the cooling circuit wave is oscillatory with distance. Hence, the helix 21 preferably has a length L as defined by Equations 4 and 5.

One advantage of the structure of FIG. 4 over that of FIG. 1 is that the single helix 21 need be provided with only two couplers for coupling wave energy onto and off of the helix whereas two separate helices would require four couplers. In addition, a single helix offers better facility for obtaining closer coupling to the beam for both pump and cooling circuit structures.

Referring now to FIG. 6 there is schematically indicated an alternative embodiment of the present invention. In the structure of FIG. 6, an electron gun 1 projects an electron beam over a beam path which is terminated in an electron collector 2 operated at a suitable positive potential B+. The tube, as in the other embodiments, includes beam cooling interaction region 3 followed by a slow-wave interaction region 4.

In the beam cooling interaction region 3, a single helix 25 is coaxially disposed of the beam and has an $\omega$–$\beta$ diagram as indicated in FIG. 7. Helix 25 is dimensioned to provide operating points $C_5$ and $P_5$ corresponding to the circuit and pump waves, respectively, to produce sum-frequency coupling of the slow beam waves with the cooling circuit wave $C_5$. However, in this particular embodiment a backward traveling circuit wave $C_5$ is utilized having a vector $OC_5$.

Pump energy is supplied to the helix 25 from a pump signal generator 22 at frequency $\omega_p$. The internal impedance of signal generator 22 is proportioned to provide a matched load to the helix 25 at the circuit wave frequency $\omega_c$. The pump wave travels in the same direction as the beam and has a phase velocity corresponding with the vector $OP_5$. Resistive load 26 is connected to the downstream terminal of helix 25 and serve to provide a match load for helix 25 at both the circuit wave frequency $\omega_c$ and the pump frequency $\omega_p$.

The cooling circuit wave $C_5$ travels in the backward direction (opposite to the beam direction) and noise energy, transferred from the slow beam wave at frequency $\omega_s$ to the cooling circuit wave at frequency $\omega_c$, is absorbed in the signal generator's matched impedance. As in the previous embodiments, resistive load 26, forming the source impedance of the circuit wave, may be suitably cooled as by liquid nitrogen to further enhance the cooling of the slow beam wave.

The cooled slow beam wave is applied to the conventional slow-wave interaction circuit 4 wherein signal energy supplied at one end of the slow wave helix 6, from signal generator 5, is amplified throughout the length of helix 6, withdrawn at 7, and applied to a useful load 8.

The energy exchange relationship between the slow beam wave 5 and the cooling circuit wave $C_5$, for the structure of FIG. 6, is different from that for the structures of FIGS. 1 and 4 in that the energy exchange relationship is non-oscillatory but rather of an exponential form as indicated in FIGS. 8a and 8b. More specifically, it can be seen that the backward traveling cooling circuit wave $C_5$ grows toward the gun end of the helix 25, whereas the slow beam wave noise power decays exponentially from the gun end of the helix 25 to the collector end of helix 25.

One advantage of the structure of FIG. 6 over the structure of FIG. 4 in that the energy exchange relationship between the slow beam wave and the cooling circuit wave, in the structure of FIG. 6, is of an exponential form, as opposed to an oscillatory form, such that the length of the helix 25 is not too important so long as it is long enough to obtain the desired degree of beam cooling.

The degree of beam cooling obtainable in the exponential form of noise power exchange mechanism of FIG. 6 is 8.6KL db, where K is given by Equation 5 and L is the length of the cooling circuit.

Referring now to FIG. 9, there is shown an alternative embodiment of the present invention. More specifically, there is schematically indicated a low noise electron discharge device for amplifying wave energy with a conventional traveling wave tube helix 6 in a traveling wave tube interaction region 4. A slow beam wave cooling apparatus 3, of the type as discussed with regard to FIG. 6, is shown coupled to the beam immediately upstream of the slow-wave interaction region 4 for cooling the slow beam wave of the electron beam. In addition, a fast wave beam cooling helix 31, in a fast wave beam interaction region 27 is provided upstream of the slow-wave interaction region 4 for cooling the fast beam wave.

Cooling the fast beam wave is desirable in the apparatus of FIG. 9 and also in the apparatus of FIGS. 1 and 4 if the slow-wave interaction region 4 or other type of beam interaction region such as, for example, a klystron interaction region, not shown, is responsive to noise power propagating in the fast wave mode. Therefore, in any of the embodiments as previously described with regard to FIGS. 1, 4 and 6, a suitable fast wave coupler, such as helix 31, is matched to the beam impedance, suitably terminated with resistive loads 28 and 29, and is provided upstream of the traveling wave tube interaction region 4 for cooling the fast beam mode at the signal frequency $\omega_s$. The fast wave cooling helix 31 may be suitably operated in the Kompfner Dip condition for beam cooling.

Referring now to FIG. 10 there is shown an alternative embodiment of the present invention. In this embodiment the signal wave energy of frequency $\omega_c$, which it is desired to amplify, is supplied from a signal source 33 as, for example, an antenna and applied as a cooling circuit wave to the upstream end of combined pump and cooling circuit wave helix 21. In this way, the signal energy at $\omega_c$ is transferred into the slow beam wave mode of the beam at the new frequency $\omega_s$ corresponding to the sum-frequency coupling conditions of Equations 2 and 3 as modified for coupling the slow beam wave to the cooling circuit wave.

The cooled slow beam wave with the signal wave energy impresses thereon, leaves the beam cooling interaction region 3 and is applied to the slow-wave interaction region 4.

The conventional slow-wave helix 6 is terminated at its upstream end in a matched resistive load 34, which may be cooled in a preferred embodiment. The signal energy previously impressed on the slow beam wave, in the cooling region 3, induces a signal at frequency $\omega_s$ on the helix 6 which cumulatively interacts with the slow beam wave to amplify the signal. The amplified signal wave at frequency $\omega_s$ is removed from the tube at 7 and applied to a suitable utilization circuit or load 8.

The above-described principle of injecting the signal wave energy $\omega_s$ as a cooling circuit wave at frequency $\omega_c$ in the beam cooling interaction region instead of in the more conventional manner on the slow-wave helix 6 at frequency $\omega_s$ is equally applicable to the other tube embodiments of FIGS. 1, 6 and 9.

For the backward traveling beam cooling circuit waves $C_5$ of FIGS. 6 and 9, the signal wave energy to be injected in the beam cooling section is applied to the downstream terminal of the beam cooling circuit 25 as a circuit wave of frequency $\omega_c$. The circuit wave may be supplied from a suitable signal source as, for example, an antenna.

Although the description, thus far, of the present invention has been primarily directed to cooling the slow longitudinal space charge mode of the electron beam, the principles set forth herein equally apply to the slow transverse electrostatic space charge mode and to the slow cyclotron mode of the beam. In the case of cooling the slow transverse electrostatic mode or the slow cyclotron mode of the beam, the helical couplers 9, 11, 6, 21, 25 and 31 would be replaced by suitable conventional transverse electrostatic wave couplers or cyclotron wave couplers.

Also, thus far, the present invention has primarily been described as it would be utilized with conventional slow beam wave interaction circuits as, for example, traveling wave tube helix 6. However, as briefly indicated above, the combined fast and slow beam wave cooler embodiment of FIG. 9 is especially useful for providing a cooled beam for use with other types of interaction circuits which interact with both fast and slow beam waves such as, for example, a klystron interaction circuit. More particularly, elements 5, 6 and 8 of FIG. 9 would be replaced by conventional klystron R.F. circuit structure including either oscillator or amplifier embodiments having one or more cavity resonators 41 successively coupled to the beam in space-displaced relationship to provide a low noise klystron oscillator or amplifier, the amplifier embodiment being shown in FIG. 11.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method for removing noise power from the slow beam wave of a beam comprising the steps of, generating a beam of charged particles having both a fast beam mode and a slow beam mode of wave propagation thereon, coupling the radio frequency fields of both a cooling circuit and a pump circuit mode of wave propagation to the beam, force modulating the beam by pump wave energy traveling on the pump circuit at a phase velocity which is not equal to either the fast or slow beam wave phase velocities at the frequency of the pump energy but which pump wave has the requisite phase velocity, at the pump frequency, to sum frequency parametrically couple the cooling circuit mode of wave propagation, having a phase velocity which is not equal to either the fast or slow beam wave phase velocities, to the slow beam wave mode thereby generating a cooling circuit wave by net transfer of noise power from the slow beam wave to the cooling circuit mode whereby noise power on the slow beam wave mode is removed to the cooling circuit.

2. The method according to claim 1 wherein the force modulation of the beam with the pump circuit wave and the transfer of noise power to the cooling circuit wave are performed within a common portion of the beam path.

3. The method according to claim 2 including the step of, injecting signal wave energy onto the slow-wave beam by exciting the coupled cooling circuit with wave energy at the circuit wave frequency carrying the signal to thereby effect a transfer of the signal wave energy from the cooling circuit to the slow beam wave at the slow-wave frequency.

4. The method for amplifying signal wave energy including the steps of, forming and projecting a beam of electrons over a predetermined beam path, collecting the electrons at the terminal end of the beam path, producing a fast and slow mode of beam wave propagation on the beam, coupling the radio frequency fields of both a cooling circuit and a pump circuit mode of wave propagation to the beam, force modulating the beam with pump wave energy traveling on the pump circuit at a phase velocity which is not equal to either the fast or slow beam wave phase velocities, at the frequency of the pump energy, but which has the requisite phase velocity at the pump freqency to sum frequency parametrically couple the cooling circuit mode of wave propagation, having a phase velocity which is not equal to either the fast or slow beam wave phase velocities, to the slow beam wave mode thereby generating a cooling circuit wave by net transfer of noise power from the slow beam wave to the cooling circuit mode whereby noise power on the slow beam wave mode is removed to the cooling circuit, injecting signal wave energy onto the slow beam wave, and cumulatively interacting the fields of a signal on a slow wave circuit with the cooled slow beam wave to amplify signal energy on the slow beam wave, and extracting the amplified signal energy from the slow beam wave.

5. The method according to claim 4 wherein the signal wave energy is injected onto the slow beam wave by exciting the cooling circuit structure with a cooling circuit wave containing the signal energy to be injected onto the slow beam wave whereby a transfer of the signal energy from the cooling circuit wave onto the slow beam wave is obtained.

6. The method according to claim 4 wherein the cooling circuit wave is a backward traveling wave.

7. In an electron discharge device;
means forming an electron gun for forming and projecting an electron beam having fast and slow beam modes of propagation and noise waves thereon;
means for collecting said electron beam;
means for removing the slow mode noise waves from said beam comprising:
means forming a radio frequency cooling circuit structure coupled to the beam;
means forming a radio frequency pump circuit structure coupled to the beam, said pump and cooling circuit means being dimensioned such that when the pump circuit means is excited at the pump frequency it produces forced modulation of said beam with a pump wave carried by said pump circuit structure at a phase velocity which is not equal to either the fast or slow beam wave velocities but of a requisite velocity to parametrically sum frequency couple the slow beam mode to the circuit mode on the cooling circuit to effect a net transfer of noise power from said slow beam wave to said cooling circuit means.

8. A high frequency amplifier including, means for forming and projecting an electron beam along a path with both fast and slow beam wave modes of propagation and noise wave energy thereon, means forming a pumping radio frequency circuit structure positioned along said path for modulating said beam with a high frequency pump circuit wave, means forming a cooling radio frequency circuit structure positioned coextensively along said beam path with said first mentioned pump structure means in wave coupling relationship with said beam for effecting a transfer of noise wave energy from the slow beam mode of said beam at a signal frequency to said cooling structure means, means for modulating said slow beam mode of said beam with wave energy at the signal frequency, means forming a slow-wave radio frequency circuit structure coupled to said slow beam mode of said beam downstream of said cooling structure means for effecting a cumulative beam-field interaction with said slow beam mode to produce low noise amplification of said signal wave, and means for extracting amplified signals from said beam.

9. The method for obtaining low noise electromagnetic interaction with a beam of charged particles including the steps of, forming and projecting a beam of electrons over a predetermined beam path, the beam having both a fast beam mode and a slow beam mode of wave propagation thereon, collecting the electrons at the terminal end of the beam path, coupling the radio frequency fields of both a cooling circuit and a pump circuit mode of wave propagation to the beam, force modulating the beam with pump wave energy traveling on the pump circuit at a phase velocity which is not equal to either the fast or slow beam wave phase velocities at the frequency of the pump energy, the pump wave having the requisite velocity at the pump frequency on the pump circuit to sum frequency parametrically couple the cooling circuit mode of wave propagation, having a phase velocity which is not equal to either the fast or slow beam wave phase velocities, to the slow beam wave mode thereby generating a cooling circuit wave by net transfer of noise power from the slow beam wave to the cooling circuit mode whereby noise power on the slow beam wave mode is removed to the cooling circuit, cooling the fast beam mode of the beam by coupling the fast beam wave to a cooling circuit wave propagating in a cooling circuit mode interacting the cooled slow and fast beam waves of the beam with the electromagnetic fields of a cavity resonator to obtain low noise interaction with the fields of the resonator, and extracting signal energy from the fields of the cavity resonator.

10. In an electron discharge device;
means forming an electron gun for forming and projecting an electron beam having fast and slow beam modes of propagation and noise wave energy thereon;
means for collecting said electron beam;
means for removing said slow mode noise wave energy from said beam comprising,
means forming a radio frequency cooling circuit structure coupled to the beam,
means forming a radio frequency pump circuit structure coupled to the beam, said pump and cooling circuit means being dimensioned such that when the pump circuit means is excited at the pump frequency it produces forced modulation of said beam with a pump wave at a phase velocity which is not equal to either the fast or slow beam wave velocities but of a requisite velocity to parametrically sum frequency couple the slow beam wave mode to the circuit mode on the cooling circuit to effect a net transfer of noise power from said slow beam wave to said cooling circuit means.

11. The apparatus according to claim 10 wherein said pump wave modulating means and said cooling circuit means are included in a single radio frequency wave propagating structure proportioned and dimensioned to provide pump circuit wave and cooling circuit wave operating points corresponding to sum-frequency parametric coupling of the cooling circuit wave to the slow beam wave.

12. The apparatus according to claim 11 wherein said single radio frequency structure is dimensioned and proportioned to provide said cooling circuit wave operating point corresponding to a backward traveling cooling wave.

13. The apparatus according to claim 10 including, means for coupling the fast beam mode of said beam to a fast cooling wave circuit mode for coupling fast wave noise power from the fast wave beam mode to said fast wave circuit to cool the fast beam mode.

14. The apparatus according to claim 13 including, a cavity resonator having the electromagnetic fields thereof coupled to said electron beam downstream of said fast beam wave and slow beam wave cooling means for electromagnetic interaction with the cooled beam, and means for extracting electromagnetic wave energy from said cavity resonator.

15. In an electron discharge device;
means for forming and projecting an electron beam along a path, said beam being characterized by the presence of both fast and slow modes of propagation and noise waves thereon, a cooling radio frequency circuit structure positioned along said beam path in an electromagnetic wave coupling relationship with said beam, a pumping radio frequency structure positioned along said beam path and disposed axially coextensively with said cooling radio frequency circuit structure, said pump and cooling circuit structures being dimensioned such that when the pump circuit structure is excited at the pump frequency it produces forced modulation of said beam with a pump wave having a phase velocity not equal to either the fast or slow beam wave velocities and having a phase velocity to parametrically sum frequency couple the slow beam wave mode to the cooling circuit mode on said cooling circuit structure to effect a net transfer of noise power from said slow beam wave to said cooling circuit structure,
means for exciting said radio frequency cooling circuit structure with a signal wave at the cooling wave frequency to effect a transfer of said signal wave from said cooling circuit to said slow beam wave.

16. The apparatus according to claim 15 wherein said excited signal wave propagates as a backward traveling wave in said cooling circuit.

17. The apparatus according to claim 15 including, means disposed along the beam path downstream of said coextensive beam cooling structure for producing cumulative beam-field interaction with the cooled slow beam wave to produce amplification of said signal wave, and means for extracting said amplified signal wave from said beam.

18. The apparatus according to claim 10 wherein the axial beam path length occupied by said cooling circuit means is approximately L long where $$L = \frac{\pi}{2K}$$

where K is the phase constant of the oscillatory wave energy exchange process between the slow beam mode and said cooling circuit wave.

19. The apparatus according to claim 10 wherein the cooling circuit mode has a higher frequency than the slow beam wave.

References Cited by the Examiner

UNITED STATES PATENTS

| | | | |
|---|---|---|---|
| 2,958,001 | 10/1960 | Ashkin et al. | 315—3 |
| 2,972,702 | 2/1961 | Kompfner et al. | 315—5.43 |
| 2,974,252 | 3/1961 | Quate | 315—3 |
| 3,009,078 | 11/1961 | Ashkin | 315—3 |
| 3,060,341 | 10/1962 | Cook | 315—3.6 |

OTHER REFERENCES

Beam Refrigeration by Means of Large Magnetic Field, Adler et al., Journal of Applied Physics, vol. 31, No. 7, pages 1201–1203, July 1960.

HERMAN KARL SAALBACH, *Primary Examiner.*

GEORGE WESTBY, RALPH G. NIELSEN, ARTHUR GAUSS, *Examiners.*

S. CHATMON, Jr., G. R. OFELT, *Assistant Examiners.*